United States Patent
Rawcliffe

(10) Patent No.: US 7,204,496 B2
(45) Date of Patent: Apr. 17, 2007

(54) ACCESSORY FOR A SNOWBOARD

(75) Inventor: Nick Rawcliffe, London (GB)

(73) Assignees: Royal College of Art, London (GB); Nicholas Rawcliffe, Lancashire (GB)

(*) Notice: Subject to any disclaimer, the term of this patent is extended or adjusted under 35 U.S.C. 154(b) by 0 days.

(21) Appl. No.: 11/062,733

(22) Filed: Feb. 22, 2005

(65) Prior Publication Data

US 2005/0212229 A1 Sep. 29, 2005

Related U.S. Application Data

(63) Continuation-in-part of application No. 10/312,129, filed as application No. PCT/GB01/02878 on Jun. 28, 2001, now abandoned.

(30) Foreign Application Priority Data

Jun. 28, 2000 (GB) .................... 0015891.5

(51) Int. Cl.
*B62B 9/04* (2006.01)

(52) U.S. Cl. ................ 280/14.21; 280/14.28; 280/28.11

(58) Field of Classification Search ........... 280/7.12, 280/16, 20, 22, 14.28, 281.1, 25, 21.1, 14.21; 441/65; 114/242, 253

See application file for complete search history.

(56) References Cited

U.S. PATENT DOCUMENTS

| | | | |
|---|---|---|---|
| 1,239,196 A | 9/1917 | Lundquist | |
| 1,435,484 A | 11/1922 | Landzettel | |
| 1,445,219 A * | 2/1923 | Larson | ........... 280/7.12 |
| 1,577,078 A | 3/1926 | Richards | |
| 1,578,415 A | 3/1926 | Ferris | |
| 1,672,782 A * | 6/1928 | Ring | ........... 280/22 |
| 2,006,325 A * | 6/1935 | Scholtes | ........... 280/14.28 |
| 2,062,953 A * | 12/1936 | Wargo | ........... 280/28.14 |
| 2,292,891 A | 8/1942 | Moerlins | |
| 3,269,742 A | 8/1966 | Funyak et al. | |
| 3,438,643 A * | 4/1969 | Spiehs | ........... 280/16 |
| 3,451,689 A * | 6/1969 | Owens | ........... 280/14.28 |
| 3,560,012 A * | 2/1971 | Auer | ........... 280/16 |
| 3,583,721 A * | 6/1971 | Doran-Webb | ........... 280/16 |
| 3,917,301 A * | 11/1975 | Fabris | ........... 280/28.14 |
| 4,129,313 A | 12/1978 | Benson | |
| 4,160,552 A | 7/1979 | Kupka | |
| 4,363,495 A | 12/1982 | Henson | |
| 4,533,150 A | 8/1985 | Hardy | |
| 4,756,700 A * | 7/1988 | Coleman | ........... 441/65 |
| 5,566,959 A | 10/1996 | Tiramani | |

(Continued)

FOREIGN PATENT DOCUMENTS

EP 0 788 053 A2 6/1997

(Continued)

*Primary Examiner*—Hau Phan
(74) *Attorney, Agent, or Firm*—Martin Fleit; Paul D. Bianco; Fleit Kain Gibbons Gutman Bongini & Bianco, P.L.

(57) ABSTRACT

An accessory for a snowboard including a plate adapted to support the feet of a rider, the plate being constructed and arranged to be secured releasably to the snowboard, and having a steering mechanism, which is pivotably mounted onto said plate and which is constructed to extend away from the snowboard in a first arrangement, and to lie substantially parallel to the snowboard in a further arrangement.

6 Claims, 4 Drawing Sheets

U.S. PATENT DOCUMENTS

| | | | |
|---|---|---|---|
| 5,683,097 A | 11/1997 | Fenton et al. | |
| 6,036,202 A * | 3/2000 | LaCome | 280/28.14 |
| 6,139,031 A * | 10/2000 | Wingard | 280/14.28 |
| 6,634,657 B2 | 10/2003 | Graham | |

FOREIGN PATENT DOCUMENTS

| | | |
|---|---|---|
| WO | WO 99/29377 | 6/1999 |

* cited by examiner

ACCESSORY FOR A SNOWBOARD

RELATED APPLICATION

This application is a continuation-in-part of application Ser. No. 10/312,129, filed Apr. 10, 2003 now abandoned, the contents of which are here incorporated by reference in their entirety. The benefit of 35 USC 120 are claimed.

BACKGROUND OF THE INVENTION

1. Field of the Invention

This invention relates to improvements in or relating to snowboards.

2. Prior Art

Snowboards have, in recent times, become extremely popular as an alternative to skiing. The snowboard combines techniques of surfing with conventional snow skiing.

An improved snowboard is disclosed in EP 0 778 053. This snowboard has a convex bottom surface, and is provided with a handle pivotably attached to the board. The handle can be held in a position by a spring-loaded click mechanism but can be easily displaced from that position by a force of the type that is exerted on it when the rider falls off the snowboard.

WO99/29377 describes a snowboard having a handle that is pivotally connected to the board; the handle is supported by a spring or piston to allow it to flex relative to the board.

SUMMARY OF THE INVENTION

According to the present invention, there is provided an accessory for a snowboard, comprising a plate adapted to support the feet of a rider, the plate being constructed and arranged to be secured releasably to the snowboard, and having a steering mechanism which is pivotably mounted on said plate and which is constructed to extend away from the snowboard in a first arrangement and be lockable in said extended first arrangement.

The steering mechanism may be constructed to extend away from the snowboard in said first arrangement, and to lie substantially parallel to the snowboard in a further arrangement so that it can be stored or carried in the compact further arrangement or configuration.

The present invention further comprises a snowboard accessory comprising:

a first plate that is securable to a snowboard, a steering mechanism pivotally attached at at least one connection point to the first plate and which is configured to extend away from the snowboard in a first arrangement, a second plate that is securable to a snowboard and a frame member pivotally connected to said second plate and pivotally connected to said steering mechanism at a position above said at least one connection point.

When the first and second plates are secured to a snowboard, the steering mechanism and the frame member form, with the snowboard, a polygonal, preferably triangular, framework that locks the steering mechanism in said extended first arrangement that allows the mechanism to be manipulated by the rider to steer the snowboard and, at the same time, transmit forces to the rear of the snowboard via the frame member to increase the control of the snowboard; the pivotable nature of the joints between the plates, the steering mechanism and the cross frame member allows the snowboard to flex longitudinally, which is desirable for increased control of the board, as described above.

Although it is within the scope of the present invention for the first and second plate to be formed integrally with each other, it is preferred that separate plates are provided.

The present invention further comprises a snowboard including an accessory as described and fasteners securing said accessory to said snowboard.

BRIEF DESCRIPTION OF THE DRAWINGS

Embodiments of the invention will now be described, by way of example only, with reference to the accompanying diagrammatic drawings, in which.

DETAILED DESCRIPTION OF PREFERRED EMBODIMENTS OF THE INVENTION

Figure 1:
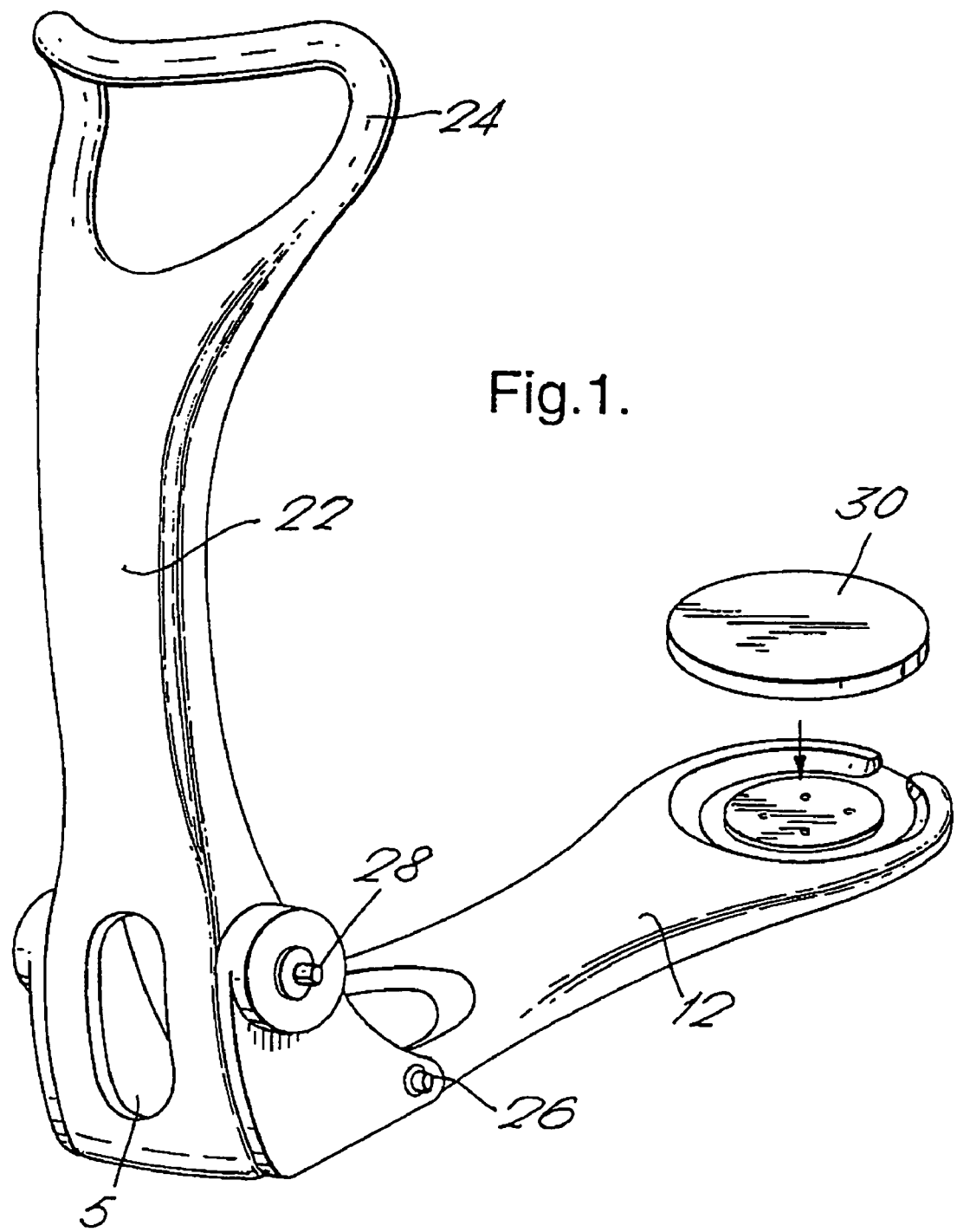
FIG. 1 shows a general view of an accessory according to the present invention in a first arrangement.
Figure 2:
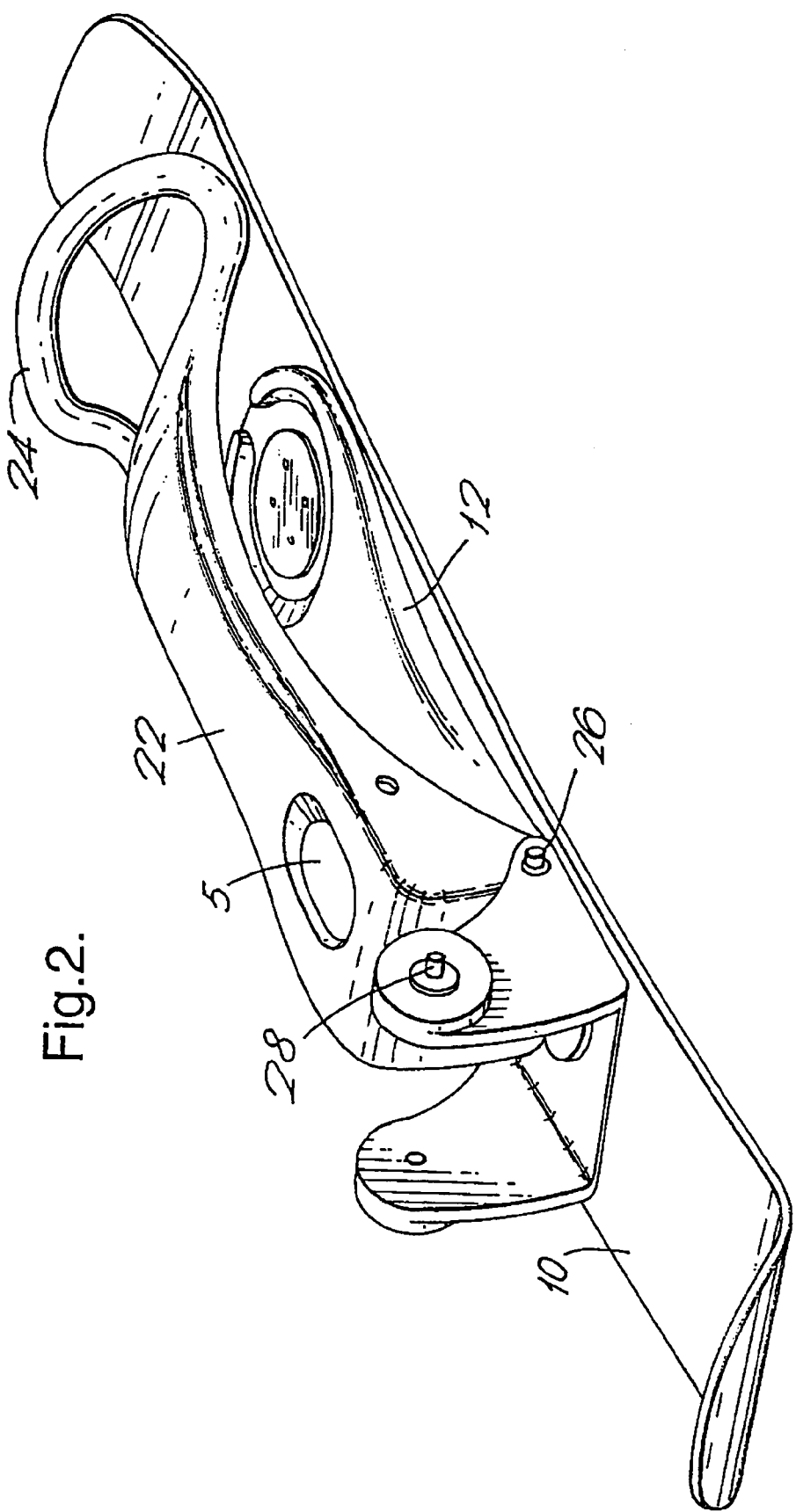
FIG. 2 shows the snowboard and accessory in a second arrangement.

Referring FIGS. 1 and 2, there is shown generally a conventional snowboard 10, comprising an elongate, surfboard-like structure, on which a rider (not shown) stands in use. Connected to the snowboard 10 is a base plate 12. Connection is by way of blind bolts (not shown). Pivotally connected to the base plate 12 is a handlebar stem 22 on which is mounted a handlebar 24. Pivot 26 may be locked so that handlebar 22 is maintained in a substantially upright orientation with respect to base plate 12 or it may be left unlocked. A variable pitch setting means 28 can be fitted which permits the stem 22 to be inclined with respect to the baseboard. Once inclined the stem may be locked in place.

A disadvantage with prior art handle snowboards is that there is a requirement for the board to be much more rigid longitudinally than normal, or be adapted to have a convex snow engaging surface. Snow boards are designed to be stiff torsionally, but resiliently flexible longitudinally to maintain edge contact with the snow. More rigid boards are disadvantageous in that they turn in an unpredictable manner. By providing a separate plate on which the rider stands in use, a snowboard having normal flex patterns can be used, resulting in more predictable turning, whilst providing the ability to steer the snowboard using the handlebar. This is because of the lever effect of the handlebar.

Conventional snowboards have a number of holes predrilled in their top surface to provide conventional foot bindings, which are secured to the board using standard fixings, e.g. M6 bolts. These same predrilled holes can be used for fixing the accessory of the present invention using the same fixings as are used to secure the bindings.

In the present example shown in FIGS. 1 and 2, the accessory is attached to the snowboard by four M6 bolts using the holes predrilled in the top surface of the snowboard for conventional bindings. An alternative fixing arrangement using quick release clips could be used to enable the base plate to be removed from the snowboard quickly. In either case, the accessory can be removed and the snowboard fitted with conventional bindings if desired. This feature of the invention means that it is more versatile because the snowboard can be used conventionally as well as with the base plate and handlebar. Preferably foot grips (30) are provided on the base plate. These can simply be rubber pads with a high coefficient of friction, or they could be neoprene loops (as used on wind-surfers), or more conventional snowboard bindings. However, loops are preferably not provided because they can cause the rider to sprain a joint or break a bone by retaining the rider's feet when the rider falls.

An advantage of high friction, e.g. rubber, pads or making the plate to engage the rider's footwear is that a snowboard rider is not strapped to the snowboard. This means that when the rider falls over, he is not attached to the snowboard and this reduces the risk of injury.

The handlebar stem can be provided with an opening (5), which enables the accessory and board to be carried easily in the folded arrangement as shown in FIG. 2.

Although in the embodiment described above the accessory is releasably securable to the snowboard, the snowboard itself could be modified to have a more rigid portion integrally formed with the rest of the board on which a person could stand, for example by building up a central part of the board to make it thicker and therefore stiffer longitudinally, without compromising the overall flexibility or snow contacting properties of the edges of the board.

Figure 3:
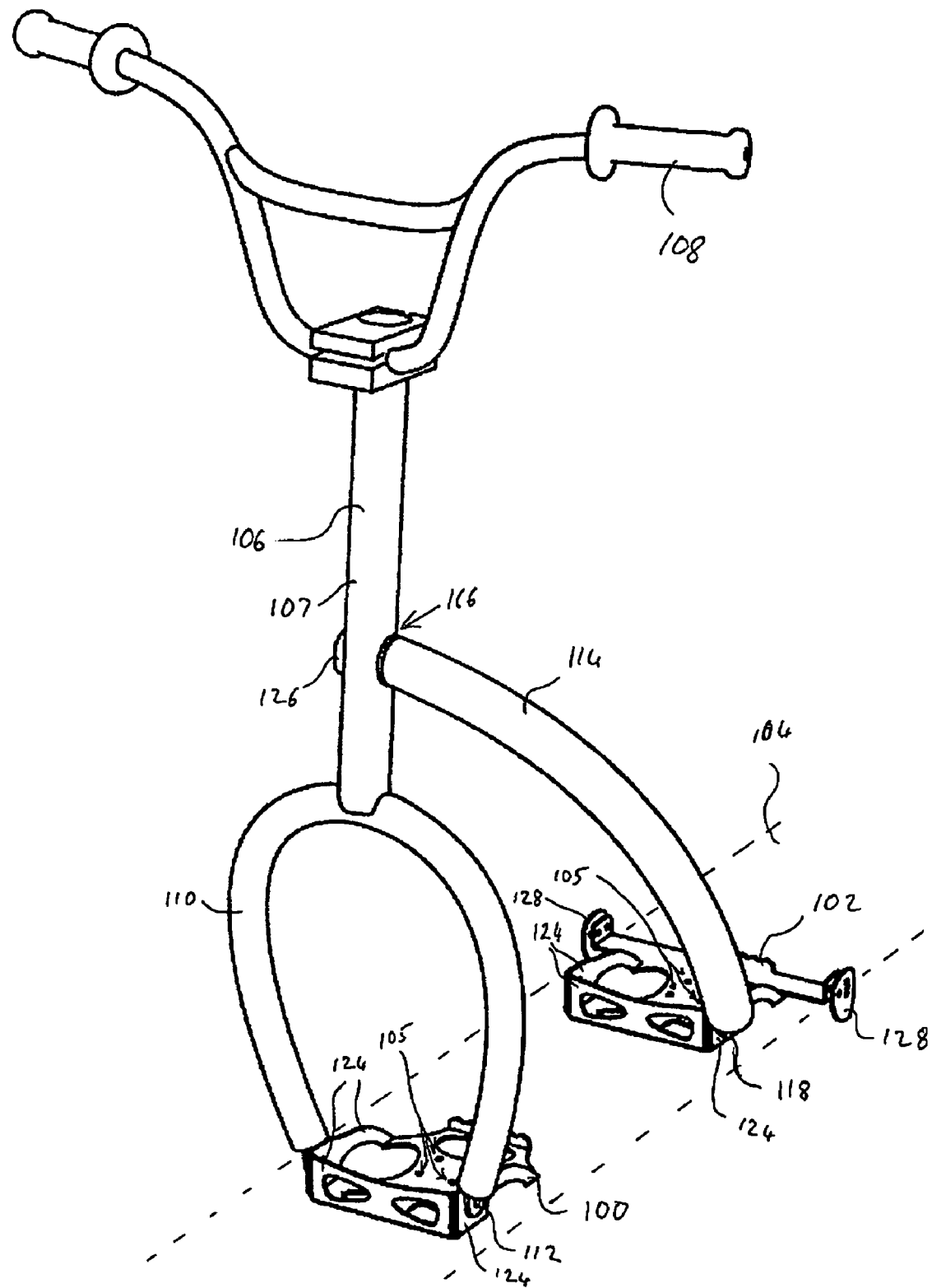
FIG. 3 shows, in perspective, a second embodiment of the snowboard accessory in accordance with the present invention.
Figures 4, 5:
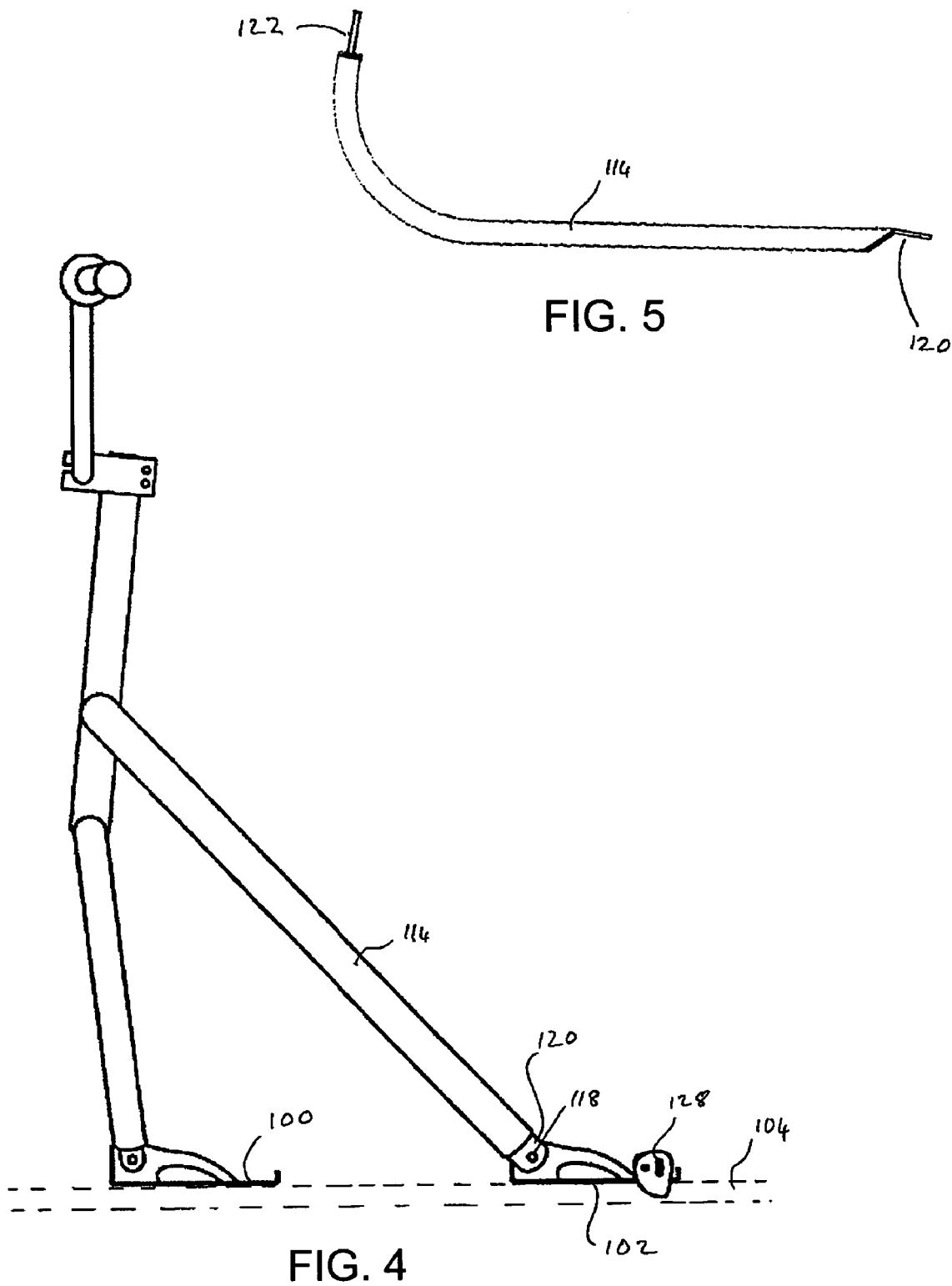
FIG. 4 shows a side view of the accessory of FIG. 3.
FIG. 5 shows a plan view of the crossbar of the accessory of FIGS. 3 and 4.

A second embodiment in accordance with the present invention is shown in connection with FIGS. 3 and 4. The accessory includes a front plate 100 and rear plate 102 that can be secured to a snowboard, which is shown schematically at 104. The plates are secured to the top of the snowboard using the standard pre-formed tapped holes that are conventionally provided in the top surface of a snowboard to provide foot bindings. The plates are secured by passing appropriate fastenings, for example M16 bolts, through holes 105 in the plates and securing them in the standard pre-formed tapped holes in the underlying snowboard.

Attached to the front plate 100 is a steering mechanism 106 that includes a pair of handle bars 108, a stem 107 and a pair of forks 110. The forks 110 are pivotally attached to the front plate 100 by means of pivot pins 112 (only one pivot pin 112 is visible in FIGS. 3 and 4). A crossbar 114 is pivotally connected at its front end to the stem 107 of the steering mechanism 106 by means of a pivot joint, which is described below. The rear end of the cross frame member 114 is pivotally connected by pivot pins 118 (only one visible in FIGS. 3 and 4) to the rear plate 102.

As can be seen in FIG. 5, the crossbar 114 has at one end a pin 122. This pin passes through a hole in the stem 107 and is secured by a washer and a nut 126 or other equivalent fixing arrangement that allows the pin 122 to turn about the pin 122 in the hole in the stem.

As best seen in FIG. 5, the crossbar 114 is bow-shaped and this allows the rider to stand in the middle of the board 104 with one foot on the front plate and the other on the rear plate 102. Raised ridges 124 may be provided on the plate (see FIG. 4) to assist in the location of the heels of the rider's shoes/boots and prevent them from slipping during snowboarding.

The side ridges 124 of the back plate 102 are also used for securing the rear end of the crossbar, which is provided with a flat section 120 that contains a hole (see FIG. 5). The pivot pin 118 is passed through the hole in the flat section 120 and through a hole in one of the side ridges on the rear plate 102. In this way, the cross bar is allowed to pivot with respect to the rear plate about the pin 118. In a similar way, the ends of the two forks 110 carry flat sections having holes (not visible) through which pivot pins 112 pass. The pivot pins 112 also pass through corresponding holes in the side ridges 124 of the front plate. The pivot pins are secured in position by any suitable fastening mechanism, e.g. a washer and a nut, a clip, etc.

Returning to FIG. 5, it can be seen that the cross bar lies to the left of the stem 107. However, if the rider prefers, it can be reversed and secured on the right-hand side of the stem, in which case, the rear end of the cross bar 114 is secured to the right hand side ridge 124 of the rear plate.

Because the rider's feet are held against slipping by the ridges on the plates, it is possible to ride the snowboard without foot bindings, which means that, when the rider falls, his feet are not fastened to the snowboard. The fastening of a rider's legs to a board using bindings is a major cause of broken legs during snowboarding.

The triangular arrangement of the frame formed by the steering column 106, the cross bar 114 and the plates 100,102 secured to the snowboard 104 means that the steering column 106 is locked robustly in the upright position and considerable force can be exerted on it by the rider so that he/she can maintain position on the snowboard and also maneuver the snowboard to help change direction. Snowboards are flexible longitudinally and the snowboard 104 can flex in the shown arrangement shown as a result of the connections between the steering column 106, the crossbar 114 and the plates 100,102 being able to pivot with respect to each other about the respective pivot pins, which are all arranged generally horizontally. The flexing of the board also allows a little play in the steering column 106, and so reduces the jarring effect on the rider's arm and shoulders.

A further advantage of the use of a crossbar 114 is that force can be transmitted to the rear of the snowboard by the rider twisting the handlebars 108, thereby pulling the rear of the board round, thus making it easier to change direction.

When changing direction, it is possible for the rear end of the board to skid too far; to help prevent this, fins 128 overhang the side of the board, preventing sideways drift of the rear of the board and making the board more controllable.

It is preferred that at least one of the pivoting joints between the steering column 106, the cross bar 114 and the plates 100,102 is able to be readily removed, e.g. manually, so that the steering mechanism 106 and the cross bar 114 can be collapsed to lie flat against the board. The preferred joint is the joint between the steering column 106 and the cross bar 114 since this will leave the accessory secured to the snowboard at two places.

From the foregoing discussion, it can be seen that the present invention comprises an improved snowboard and an accessory that can be releasably attached to a snowboard that provide the rider of a snowboard increased control. It will be appreciated by those of ordinary skill in the art that changes may be made to the embodiment described above without departing from the spirit and scope of the invention as defined by the appended claims.

I claim:

1. A snowboard accessory for mounting on an elongated snowboard having a forward end and a rear end and longitudinal edges comprising:

a first plate that is securable to a snowboard closer to its forward end, a steering mechanism having a first end pivotally attached at at least one connection point to the first plate and a second free end, the steering mechanism being configured to extend up and away from the snowboard in a first arrangement, a second plate that is securable to the snowboard closer to its rear end but spaced therefrom, and extending transversely between the longitudinal edges of the snowboard, and a frame member pivotally connected to said second plate on one transverse side thereof and pivotally connected to said steering mechanism at a position spaced above said at least one connection point, wherein the accessory is configured such that, when the first and second plates are secured to the snowboard, the steering mechanism and the frame member form, with the snowboard, a triangular framework that locks the steering mechanism in said extended first arrangement to enable the snowboard to flex longitudinally, and wherein the frame member, pivotally connected on one transverse side of said second plate, enables a rider to stand in the middle portion of the snowboard between its longitudinal edges with one foot on the rear plate, and enables a rider on the board to transmit forces to the rear end of the snowboard via the frame member to increase the control of the snowboard.

2. An accessory as claimed in claim 1, wherein the pivot connecting said frame member to the steering mechanism is manually disconnectable.

3. An accessory as claimed in claim 1, wherein said frame member is curved horizontally.

4. An accessory as claimed in claim 1, which includes fins attached to the sides of the second plate that extend downwardly therefrom.

5. An accessory as claimed in claim 1 wherein at least one of the first and second plates has ridges that can engage a rider's footwear when standing on such plate.

6. A snowboard including an accessory as claimed in claim 1, and fasteners securing said accessory to said snowboard, wherein the frame member is connected to the snowboard at one side of the snowboard.

\* \* \* \* \*